US009738140B2

(12) United States Patent
Ash et al.

(10) Patent No.: US 9,738,140 B2
(45) Date of Patent: Aug. 22, 2017

(54) ELECTROCHROMIC DEVICES

(71) Applicant: GENTEX CORPORATION, Zeeland, MI (US)

(72) Inventors: Kevin L. Ash, Zeeland, MI (US); Kelvin L. Baumann, Zeeland, MI (US); Sue F. Franz, Zeeland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 14/815,030

(22) Filed: Jul. 31, 2015

(65) Prior Publication Data

US 2016/0033838 A1 Feb. 4, 2016

Related U.S. Application Data

(60) Provisional application No. 62/033,059, filed on Aug. 4, 2014, provisional application No. 62/033,363, filed on Aug. 5, 2014.

(51) Int. Cl.
  *G02F 1/153* (2006.01)
  *B60J 3/04* (2006.01)
  *G02F 1/15* (2006.01)

(52) U.S. Cl.
  CPC ...... *B60J 3/04* (2013.01); *G02F 1/15* (2013.01); *G02F 2001/1512* (2013.01)

(58) Field of Classification Search
  CPC ........ B60J 3/04; G02F 1/15; G02F 2001/1512
  USPC .......... 359/265–275; 345/105; 252/582, 583, 252/586
  See application file for complete search history.

(56) References Cited

U.S. PATENT DOCUMENTS

| 4,297,401 A | 10/1981 | Chern et al. |
| 4,418,102 A | 11/1983 | Ferrato |
| 4,695,490 A | 9/1987 | McClelland et al. |
| 4,902,108 A | 2/1990 | Byker |
| 5,596,023 A | 1/1997 | Tsubota et al. |
| 5,596,024 A | 1/1997 | Horie et al. |

(Continued)

FOREIGN PATENT DOCUMENTS

| WO | WO-98/42796 | 10/1998 |
| WO | WO-99/02621 | 1/1999 |
| WO | WO-2007/011499 A2 | 1/2007 |

OTHER PUBLICATIONS

International Search Report and Written Opinion for PCT/US2015/043084, dtd Dec. 10, 2015 (9 pages).

*Primary Examiner* — Tuyen Tra
(74) *Attorney, Agent, or Firm* — Foley & Lardner LLP; Bradley D. Johnson

(57) ABSTRACT

An electrochromic device includes a first substantially transparent substrate having an electrically conductive material associated therewith, a second substantially transparent substrate having an electrically conductive material associated therewith, an electrochromic composition contained within a chamber positioned between the first and second substrates that includes at least one anodic electroactive material, at least one cathodic electroactive material, and at least one solvent, wherein at least one of the anodic electroactive and cathodic electroactive materials is electrochromic, and wherein the electrochromic device exhibits a contrast ratio of at least 20,000:1, a darkening time less than about 30 seconds, and a clearing time of less than about 150 seconds.

19 Claims, 1 Drawing Sheet

(56) References Cited

U.S. PATENT DOCUMENTS

| | | |
|---|---|---|
| 5,928,572 A | 7/1999 | Tonar et al. |
| 5,998,617 A | 12/1999 | Srinivasa et al. |
| 6,020,987 A | 2/2000 | Baumann et al. |
| 6,037,471 A | 3/2000 | Srinivasa et al. |
| 6,141,137 A | 10/2000 | Byker et al. |
| 6,157,480 A | 12/2000 | Anderson et al. |
| 6,188,505 B1 | 2/2001 | Lomprey et al. |
| 6,193,912 B1 | 2/2001 | Thieste et al. |
| 6,241,916 B1 | 6/2001 | Claussen et al. |
| 6,242,602 B1 | 6/2001 | Giri et al. |
| 6,249,369 B1 | 6/2001 | Theiste et al. |
| 6,392,783 B1 * | 5/2002 | Lomprey ................ C07F 17/02 252/583 |
| 6,519,072 B2 | 2/2003 | Nishikitani et al. |
| 6,635,194 B2 | 10/2003 | Kloeppner et al. |
| 6,710,906 B2 | 3/2004 | Guarr et al. |
| 6,714,334 B2 | 3/2004 | Tonar |
| 7,046,418 B2 | 5/2006 | Lin et al. |
| 7,372,611 B2 | 5/2008 | Tonar et al. |
| 7,428,091 B2 | 9/2008 | Baumann et al. |
| 7,855,821 B2 | 12/2010 | Baumann et al. |
| 7,990,603 B2 | 8/2011 | Ash et al. |
| 2005/0162728 A1 | 7/2005 | Warner et al. |
| 2013/0120821 A1 | 5/2013 | Chandrasekhar |
| 2013/0182308 A1 | 7/2013 | Guarr et al. |

\* cited by examiner

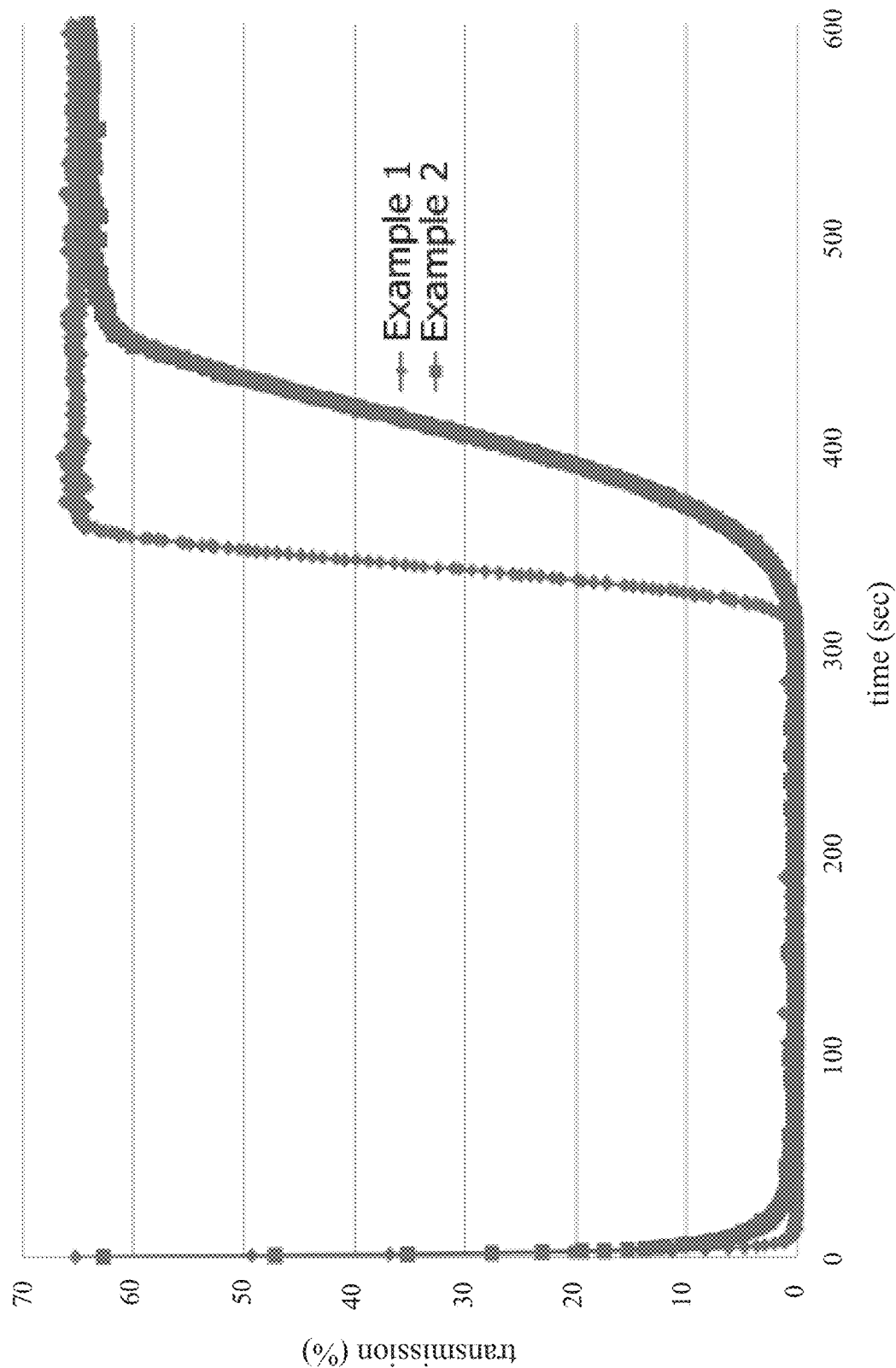

ELECTROCHROMIC DEVICES

CROSS-REFERENCE TO RELATED APPLICATIONS

This application claims the benefit of U.S. Provisional Patent Application Nos. 62/033,059, filed on Aug. 4, 2014, and 62/033,363, filed on Aug. 5, 2014, the entire disclosures of which are incorporated herein by reference for any and all purposes.

FIELD

The present technology relates generally to the field of electrochromic devices and the use thereof.

BACKGROUND

The following description is provided to assist the understanding of the reader. None of the information provided or references cited is admitted to be prior art in the present technology.

Variable transmission electrochromic windows have recently become commercially available. For example, electrochromic windows have recently become associated aircraft window systems. While such variable transmission electrochromic windows have become increasingly popular, limitations relative to their low transmission state and delayed darkening and clearing remain problematic.

SUMMARY

In one aspect, an electrochromic device is provided including a first substantially transparent substrate having an electrically conductive material associated therewith, a second substantially transparent substrate having an electrically conductive material associated therewith, an electrochromic composition contained within a chamber positioned between the first and second substrates that includes at least one anodic electroactive material, at least one cathodic electroactive material, and at least one solvent, wherein at least one of the anodic electroactive and cathodic electroactive materials is electrochromic, and wherein the electrochromic device exhibits a contrast ratio of at least 20,000:1, a darkening time less than about 30 seconds, and a clearing time of less than about 150 seconds.

In one embodiment, the electrochromic device may have a contrast ratio of about 40,000:1 to about 500,000:1. In another embodiment, the electrochromic device may have a contrast ratio of at least 60,000:1. In another embodiment, the electrochromic device may have a contrast ratio of at least 80,000:1.

In one embodiment, the electrochromic device may have a clearing time of about 20 seconds to about 150 seconds. In another embodiment, the electrochromic device may have a clearing time of about 20 seconds to about 60 seconds.

In one embodiment, the electrochromic device may have a darkening time of about 5 seconds to about 30 seconds. In another embodiment, the electrochromic device may have a darkening time of about 10 seconds to about 20 seconds.

In one embodiment, the first substantially transparent substrate and second substantially transparent substrate have a cell distance of less than 500 μm. In another embodiment, the first substantially transparent substrate and second substantially transparent substrate have a cell distance of about 150 μm to about 500 μm. In another embodiment, the first substantially transparent substrate and second substantially transparent substrate have a cell distance of about 300 μm to about 400 μm. In another embodiment, the first substantially transparent substrate and second substantially transparent substrate have a cell distance of about 350 μm.

In one embodiment, at least one of the anodic electroactive materials has a concentration of at least 5 mM. In another embodiment, at least one of the anodic electroactive materials has a concentration of about 5 mM to about 60 mM. In another embodiment, at least one of the anodic electroactive materials has a concentration of about 5 mM to about 7 mM. In another embodiment, a second anodic electroactive material has a concentration of about 50 mM to about 60 mM.

In one embodiment, at least one of the cathodic electroactive materials has a concentration of at least 50 mM. In another embodiment, at least one of the cathodic electroactive materials has a concentration of about 60 mM to about 100 mM.

In one embodiment, at least one of the anodic electroactive material includes a substituted or unsubstituted phenazine compound. In another embodiment, at least one of the anodic electroactive material includes a substituted or unsubstituted 2,7-dialkyl-5,10-dialkyl-5,10-dihydrophenazine compound. In another embodiment, at least one alkyl group of the 5,10-dialkyl includes at least four carbon atoms and is void of any β hydrogen atoms, and at least one alkyl group of the 2,7-dialkyl includes at least four carbons. In another embodiment, at least one alkyl group of the 5,10-dialkyl includes a substituted or unsubstituted neopentyl group, and at least one alkyl group of the 2,7-dialkyl includes a substituted or unsubstituted neopentyl, isobutyl, 2-ethylbutyl, 2-methylbutyl, 2-ethylhexyl, or 2-propylpentyl. In another embodiment, at least one alkyl group of the 5,10-dialkyl includes a neopentyl group, and at least one alkyl group of the 2,7-dialkyl includes an isobutyl group. The electrochromic medium may also include a mixture of 2,7- and 2,8-phenazine isomers.

In one embodiment, at least one of the cathodic electroactive material includes a viologen. Such viologens may be substituted or unsubstituted. In another embodiment, the cathodic electroactive material includes an N,N'-dialkyl-dipyridinium compound (i.e. a "viologen"). In another embodiment, at least one alkyl of the N,N'-dialkyldipyridinium includes at least four carbon atoms and less than two β hydrogen atoms. In another embodiment, at least one alkyl group attached to the dipyridinium compound is a (2-ethylhexyl) group. In some embodiments, the viologen counter ion is any anion. In another embodiment, the counter ion is $BF_4$, $PF_6$, $SbF_6$, p-toluenesulfonate, trifluoromethansulfonate, or bis-trifluoromethanesulfonimide.

In one embodiment, the electrochromic composition further includes an anodic and/or cathodic color-stabilizing redox buffer. Examples of suitable anodic and cathodic redox buffers include, but are not limited to, metallocenes (e.g., substituted ferrocenes) having different oxidation states.

In one embodiment, the electrochromic composition may further include a cross-linked polymer matrix, a free-standing gel, and/or a substantially non-weeping gel.

In one aspect, the present technology is directed to an aircraft window system including a housing for containing a first substantially transparent interior substrate, a second substantially transparent exterior substrate, and a variable transmission electrochromic window positioned between the interior and exterior substrates, wherein the variable transmission electrochromic window includes: a third substantially transparent substrate having an electrically conductive material associated therewith; a fourth substantially transparent substrate having an electrically conductive material associated therewith; an electrochromic composition contained within a chamber positioned between the first and second substrates including at least one anodic electroactive material, at least one cathodic electroactive material, and at least one solvent, wherein at least one of the anodic electroactive and cathodic electroactive materials is electrochromic; and wherein the electrochromic device exhibits a contrast ratio of at least 20,000:1, a darkening time less than about 30 seconds, and a clearing time of less than about 150 seconds.

The foregoing summary is illustrative only and is not intended to be in any way limiting. In addition to the illustrative aspects, embodiments and features described above, further aspects, embodiments and features will become apparent by reference to the following drawings and the detailed description.

BRIEF DESCRIPTION OF THE DRAWINGS

The FIGURE is a graph representing the darkening time and clearing time according to one embodiment of the present technology, and the darkening time and clearing time for a prior art electrochromic device.

DETAILED DESCRIPTION

The present technology is described herein using several definitions, as set forth throughout the specification.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

In general, "substituted" refers to a group, in which one or more bonds to a hydrogen atom contained therein are replaced by a bond to non-hydrogen or non-carbon atoms. Substituted groups also include groups in which one or more bonds to a carbon(s) or hydrogen(s) atom are replaced by one or more bonds, including double or triple bonds, to a heteroatom. In some embodiments, a substituted group is substituted with 1, 2, 3, 4, 5, or 6 substituents. Examples of substituent groups include: halogens (for example, F, Cl, Br, and I), hydroxyl (alcohol), alkoxy, alkenoxy, alkynoxy, aryloxy, aralkyloxy, carbonyls (oxo), carboxyls, esters, ketones, amides, urethanes, thiols, sulfides, sulfoxides, sulfones, sulfonyls, sulfonamides, amines, isocyanates, isothiocyanates, cyanates, thiocyanates, nitro groups, nitriles (for example, CN), phosphoryl, phosphonyl, aryl, olefin, alkyl, cycloalkyl and the like.

As used herein, "alkyl" groups include straight chain and branched alkyl groups having from 1 to about 20 carbon atoms, and typically from 1 to 12 carbons or, in some embodiments, from 1 to 8 carbon atoms. As employed herein, "alkyl groups" include cycloalkyl groups as defined below. Alkyl groups may be substituted or unsubstituted. Examples of straight chain alkyl groups include methyl, ethyl, n-propyl, n-butyl, n-pentyl, n-hexyl, n-heptyl, and n-octyl groups. Examples of branched alkyl groups include, but are not limited to, isopropyl, sec-butyl, t-butyl, neopentyl, and isopentyl groups. Representative substituted alkyl groups may be substituted one or more times with, for example, amino, thio, hydroxy, cyano, alkoxy, and/or halo groups such as F, Cl, Br, and I groups. As used herein the term haloalkyl is an alkyl group having one or more halo groups. In some embodiments, haloalkyl refers to a per-haloalkyl group.

"Clearing time" as used herein refers to the time required at short circuit for an electrochromic device, starting in a minimum low transmission state and after maintaining the device in the minimum low transmission state for at least 250 seconds, to attain 98% of the transmission range between the minimum transmission value and the maximum transmission value of the device as measured at short circuit.

"Darkening time" as used herein refers to the time required for an electrochromic device to transition from a high transmission state at short circuit (or in an unpowered state) to reach 90% of the transmission range between the highest transmission value and of the lowest transmission value of the device.

"Contrast ratio" as used herein refers to the ratio of the initial high transmission steady state value for a device in a short circuit to the steady state a transmission value in its fully powered state.

In one aspect, an electrochromic device including a solution phase electrochromic medium exhibits a contrast ratio of at least 20,000:1, a darkening time less than about 30 seconds, and a clearing time of less than about 150 seconds.

In another aspect, an electrochromic device includes a first substantially transparent substrate having an electrically conductive material associated therewith, a second substantially transparent substrate having an electrically conductive material associated therewith, an electrochromic composition contained within a chamber positioned between the first and second substrates that includes at least one anodic electroactive material, at least one cathodic electroactive material, and at least one solvent, wherein at least one of the anodic electroactive and cathodic electroactive materials is electrochromic, and wherein the electrochromic device exhibits a contrast ratio of at least 20,000:1, a darkening time less than about 30 seconds, and a clearing time of less than about 150 seconds.

In some embodiments, the first substrate may be fabricated from any one of a number of materials that are transparent or substantially transparent in the visible region of the electromagnetic spectrum, such as, for example, borosilicate glass, boroaluminosilicate glass, soda lime glass, natural and synthetic polymeric resins, plastics, and/or composites including polyesters (e.g. PET), polyimides (PI), polycarbonates, polysulfones, polyethylene naphthalate (PEN), ethylene vinyl acetate (EVA), acrylate polymers, polyamides like Trogamide® CX 7323 from Evonik Industries, cyclic olefin polymers (COP), and cyclic olefin copolymers (COC) like Topas®. In another embodiment, the first substrate is fabricated from a sheet of glass having a thickness ranging from approximately 0.10 millimeters (mm) to approximately 12.7 mm, from approximately 0.50 mm to approximately 1.50 mm, or from approximately 0.65 mm to approximately 1.00 mm. Of course, the thickness of the substrate will depend largely upon the particular application of the variable transmission electrochromic window. While particular substrate materials have been disclosed, for illustrative purposes only, numerous other substrate materials may be used, provided they are substantially transparent and exhibit appropriate physical properties, such as strength, to be able to operate effectively in conditions of intended use. Indeed, variable transmission electrochromic windows in accordance with the present invention can be, during normal operation, exposed to extreme temperature variation as well as substantial UV radiation, emanating primarily from the sun. It will be further understood that the first substrate and/or second substrate may include a UV absorbing layer and/or contain a UV absorbing material to help protect the substrate(s) and/or the electrochromic media from UV damage.

In some embodiments, the second substrate may be fabricated from similar materials as that of the first substrate. In another embodiment, the second substrate is fabricated from a sheet of glass or plastic having a thickness ranging from approximately 0.10 mm to approximately 12.7 mm, from approximately 0.50 mm to approximately 1.50 mm, or from approximately 0.65 mm to approximately 1.00 mm. If the first and second substrates are fabricated from sheets of glass, then the glass can optionally be tempered, heat strengthened, chemically strengthened, and/or laminated prior to or subsequent to being coated with layers of electrically conductive material. The first and second substrates may be laminated to materials that are similar to them in composition or different from them in composition.

One or more layers of electrically conductive material may be associated with the rear surface of the first substrate. These layers serve as an electrode for the variable transmission electrochromic window. Electrically conductive material is desirably a material that: (a) is substantially transparent in the visible region of the electromagnetic spectrum; (b) bonds reasonably well to the first substrate; (c) maintains this bond when associated with a sealing member; (d) is generally resistant to corrosion from materials contained within the variable transmission electrochromic window or the atmosphere; and (e) exhibits minimal diffuse or specular reflectance as well as sufficient electrical conductance. The electrically conductive material may be fabricated from fluorine doped tin oxide (FTO), for example TEC glass, indium/tin oxide (ITO), doped zinc oxide, indium zinc oxide, metal oxide/metal/metal oxide (wherein metal oxide can be substituted with metal carbide, metal nitride, metal sulfide, etcetera), or other materials known to those having ordinary skill in the art. Alternatively one or more metals or alloys can be deposited in a pattern to create a grid or nano-structured electrode on the substrate.

One or more layers of an electrically conductive material made of the same or different materials as those associated with the rear surface of the first substrate may be associated the front surface of the second substrate. The electrically conductive material may be operatively bonded to electrically conductive material associate with the first substrate by a sealing member. Once bonded, the sealing member, plug and/or the juxtaposed portions of electrically conductive materials may serve to generally define an inner peripheral geometry of a chamber. Alternatively, edge sealing techniques may be utilized which are disclosed in U.S. Pat. No. 7,372,611 entitled Vehicular Rearview Mirror Elements And Assemblies Incorporating These Elements.

In some embodiments, the first substantially transparent substrate and second substantially transparent substrate have a cell distance of less than 500 µm. In another embodiment, the first substantially transparent substrate and second substantially transparent substrate have a cell distance of about 150 µm to about 500 µm, about 200 µm to about 400 µm, about 225 µm to about 375 µm, or ranges between any two of these values (including endpoints). In another embodiment, the first substantially transparent substrate and second substantially transparent substrate have a cell distance of about 350 µm, 400 µm, 375 µm, 350 µm, 325 µm, 300 µm, 175 µm, 150 µm, or ranges between any two of these values (including endpoints). In another embodiment, the first substantially transparent substrate and second substantially transparent substrate have a cell distance of about 350 µm.

In some embodiments, the sealing member may include any material that is capable of being adhesively bonded to the electrically conductive materials coated on the first and second substrate to, in turn, seal a chamber, in certain embodiments in cooperation with a plug and fill port so that electrochromic composition does not inadvertently leak out of the chamber. The sealing member may extend all the way to rear surface and front surface of their respective substrates. In such an embodiment, the layers of electrically conductive material coated on the first and second substrates may be partially removed where the sealing member is positioned. If the electrically conductive materials are not associated with their respective substrates, then the sealing member preferably bonds well to glass, plastics, or other substrates. It will be understood that sealing member can be fabricated from any one of a number of materials including, for example, those disclosed in U.S. Pat. No. 4,297,401 entitled Liquid Crystal Display And Photopolymerizable Sealant Therefor; U.S. Pat. No. 4,418,102 entitled Liquid Crystal Displays Having Improved Hermetic Seal; U.S. Pat. No. 4,695,490 entitled Seal For Liquid Crystal Display, U.S. Pat. No. 5,596,023 entitled Sealing Material For Liquid Crystal Display Panel, And Liquid Crystal Display Panel Using It, U.S. Pat. No. 5,596,024 entitled Sealing Composition For Liquid Crystal, U.S. Pat. No. 6,157,480 entitled Seal For Electrochromic Devices, and U.S. Pat. No. 6,714,334 entitled Electrochromic Device Having A Seal Including An Epoxy Resin Cured With A Cycloaliphatic Amine.

For purposes of the present disclosure, and as will be explained in greater detail herein below, the electrochromic composition may include at least one solvent, at least one anodic electroactive material (e.g., 1, 2, 3, etc.), and at least one cathodic material (e.g., 1, 2, 3, etc.).

Typically, both of the anodic and cathodic materials are electroactive and at least one of them is electrochromic. It will be understood that regardless of its ordinary meaning, the term "electroactive" will be defined herein as a material that undergoes a modification in its oxidation state upon exposure to a particular electrical potential difference. Additionally, it will be understood that the term "electrochromic" will be defined herein, regardless of its ordinary meaning, as a material that exhibits a change in its extinction coefficient at one or more wavelengths upon exposure to a particular electrical potential difference.

An electrochromic medium may include a single-layer of material, which may include small non-homogenous regions and includes solution-phase devices where a material may be contained in solution in an ionically conducting electrolyte which remains in solution in the electrolyte when electrochemically oxidized or reduced. Solution phase electroactive materials may be contained in the continuous solution-phase of a gel composition in accordance with the teachings of U.S. Pat. No. 5,928,572 entitled Electrochromic Layer And Devices Comprising Same, and International Patent Application Serial No. PCT/US98/05570 entitled Electrochromic Polymeric Solid Films, Manufacturing Electrochromic Devices Using Such Solid Films, And Processes For Making Such Solid Films And Devices.

More than one anodic and cathodic material can be combined to give a pre-selected color as described in U.S. Pat. No. 5,998,617 entitled Electrochromic Compounds; U.S. Pat. No. 6,020,987 entitled Electrochromic Medium Capable Of Producing A Pre-selected Color; U.S. Pat. No. 6,037,471 entitled Electrochromic Compounds; and U.S. Pat. No. 6,141,137 entitled Electrochromic Media For Producing A Pre-selected Color.

The anodic and cathodic materials may also be combined or linked by a bridging unit as described in U.S. Pat. No. 6,241,916 entitled Electrochromic System, and U.S. Patent Publication No. 2002/0015214 entitled Electrochromic Device. The electrochromic materials may also include near-infrared (NIR) absorbing compounds as described in U.S. Pat. No. 6,193,912 entitled Near Infrared-Absorbing Electrochromic Compounds And Devices Comprising Same.

It is also possible to link anodic materials or cathodic materials by similar methods. The concepts described in these patents can further be combined to yield a variety of electroactive materials that are linked or coupled, including linking of a redox buffer such as linking of a color-stabilizing moiety to an anodic and/or cathodic material.

The anodic and cathodic electrochromic materials can also include coupled materials as described in U.S. Pat. No. 6,249,369 entitled Coupled Electrochromic Compounds With Photostable Dication Oxidation States.

Additionally, a single-layer, single-phase composition may include a composition where the anodic and cathodic materials are incorporated into a polymer matrix as described in International Patent Application Serial No. PCT/EP98/03862 entitled Electrochromic Polymer System, and International Patent Application Serial No. PCT/US98/05570 entitled Electrochromic Polymeric Solid Films, Manufacturing Electrochromic Devices Using Such Solid Films, And Processes For Making Such Solid Films And Devices.

The electrochromic medium may be made up in layers and includes a material attached directly to an electrically conducting electrode or confined in close proximity thereto which remains attached or confined when electrochemically oxidized or reduced.

In the electrochromic medium, one or more materials may undergo a change in phase during the operation of the device, for example a material contained in solution in the ionically conducting electrolyte forms a layer on the electrically conducting electrode when electrochemically oxidized or reduced.

In addition, the electrochromic composition may include other materials, such as UV absorbers, UV stabilizers, thermal stabilizers, antioxidants, thickeners, viscosity modifiers, tint providing agents, redox buffers, and mixtures thereof. Suitable UV-stabilizers may include, but are not limited to, 2-ethyl-2-cyano-3,3-diphenyl acrylate; (2-ethylhexyl)-2-cyano-3,3-diphenyl acrylate; 2-(2'-hydroxy-4'-methylphenyl)benzotriazole, sold by Ciba-Geigy Corp. under the trademark Tinuvin P; 3-[3-(2H-benzotriazole-2-yl)-5-(1,1-dimethylethyl)-4-hydroxyphenyl]propionic acid pentyl ester-prepared from Tinuvin 213, sold by Ciba-Geigy Corp., via conventional hydrolysis followed by conventional esterification (hereinafter "Tinuvin PE"); 2,4-dihydroxybenzophenone; 2-hydroxy-4-methoxybenzophenone; and 2-ethyl-2'-ethoxyalanilide.

In one embodiment, the electrochromic composition further includes an anodic and/or cathodic color-stabilizing redox buffer. Suitable redox buffers include, among others, those disclosed in U.S. Pat. No. 6,188,505 entitled Color-Stabilized Electrochromic Devices. Other examples of suitable anodic and cathodic redox buffers include, but are not limited to, metallocenes (e.g., substituted ferrocenes) having different oxidation states.

In one embodiment, the electrochromic composition may further include a cross-linked polymer matrix, a free-standing gel, and/or a substantially non-weeping gel.

Anodic materials may include any one of a number of materials including ferrocene, substituted ferrocenes, substituted ferrocenyl salts, phenazine, substituted phenazines, phenothiazine, substituted phenothiazines including substituted triphenodithiazines, thianthrene, and substituted thianthrenes. Examples of anodic materials may include di-tert-butyl-diethylferrocene; 5,10-dimethyl-5,10-dihydrophenazine (DMP); 3,7,10-trimethylphenothiazine; 2,3,7,8-tetramethoxy-thianthrene; 10-methylphenothiazine, tetramethylphenazine (TMP; see U.S. Pat. No. 6,242,602); and bis(butyltriethylammonium)-para-methoxytriphenodithiazine (TPDT; see U.S. Pat. No. 6,710,906). The anodic material may also include a polymer film, such as a polyaniline, a polythiophene, a polymeric metallocene, or a solid transition metal oxide, including, but not limited to, oxides of vanadium, nickel, and iridium, as well as numerous heterocyclic compounds. Anodic materials include those as described in U.S. Pat. No. 4,902,108, entitled Single-Compartment, Self-Erasing, Solution-Phase Electrochromic Devices, Solutions For Use Therein, And Uses Thereof; U.S. Pat. No. 5,998,617, entitled Electrochromic Compounds; U.S. Pat. No. 6,188,505, entitled Color-Stabilized Electrochromic Devices; U.S. Pat. No. 6,710,906, entitled Controlled Diffusion Coefficient Electrochromic Materials For Use In Electrochromic Mediums And Associated Electrochromic Devices; and U.S. Pat. No. 7,428,091, entitled Electrochromic Compounds and Associated Media and Devices.

In another embodiment, at least one of the anodic electroactive material includes a phenazine compound. Such compounds may be substituted or unsubstituted. Illustrative phenazine compounds include, but are not limited to 2,7-dialkyl-5,10-dialkyl-5,10-dihydrophenazines. In some such embodiments, at least one alkyl group of the 5,10-dialkyl groups in the phenazine has at least 4 carbon atoms, and is void of any β-hydrogen atoms, and at least one alkyl group of the 2,7-dialkyl groups in the phenazine has at least 4 carbon atoms. In another embodiment, at least one alkyl group of the 5,10-dialkyl groups is a neopentyl, and at least one alkyl group of the 2,7-dialkyl groups is isobutyl, (2-ethylbutyl), or (2-propylpentyl) group. In some embodiments, at least one alkyl group of the 5,10-dialkyl groups is a neopentyl, and at least one alkyl group of the 2,7-dialkyl groups is a 2-ethyl-1-butanol. In another embodiment, at least one alkyl group of the 5,10-dialkyl groups is a neopentyl, and at least one alkyl group of the 2,7-dialkyl groups is an isobutyl.

Cathodic materials may include, for example, viologens, such as methyl viologen tetrafluoroborate, octyl viologen tetrafluoroborate (octylviologen), or benzyl viologen tetrafluoroborate; ferrocinium salts, such as (6-(tri-tertbutylferrocinium)hexyl)triethylammonium di-tetrafluoroborate (TT-BFc.$^+$) and as disclosed in U.S. Pat. No. 7,046,418 entitled Reversible Electrodeposition Devices And Associated Electrochemical Media. While specific cathodic materials have been provided for illustrative purposes only, numerous other conventional cathodic materials may be used including, but not limited to, those disclosed in previously referenced U.S. Pat. Nos. 4,902,108; 6,188,505; 6,710,906; and 7,855,821. The cathodic material may include a polymer film, such as various polythiophenes or polymeric viologens, an inorganic film, or a solid transition metal oxide, including, but not limited to, tungsten oxide. In one embodiment, at least one of the cathodic electroactive material includes a viologen. In another embodiment, at least one of the cathodic electroactive material includes a 1,1'dialkyl-4,4'-dipyridinium compound. In another embodiment, at least one alkyl group attached to the dipyridinium compound includes at least 4 carbon atoms, and fewer than two β-hydrogen atoms. In another embodiment, at least one alkyl group of the dipyridinium compound includes a (2-ethylhexyl) group. In some embodiments, a viologen counter ion is any anion. Illustrative anions include, but are not limited to, $BF_4^-$, $PF_6^-$, $SbF_6^-$, p-toluenesulfonate, trifluoromethansulfonate, or bis-trifluoromethanesulfonimide.

In one embodiment, the electrochromic device may have a clearing time of about 20 seconds to about 150 seconds. In another embodiment, the electrochromic device may have a clearing time of about 20 seconds to about 100 seconds, about 25 seconds to about 85 seconds, about 30 seconds to about 70 seconds, about 35 seconds to about 55, about 40 seconds to about 50 seconds, or ranges between any two of these values (including endpoints). In another embodiment, the electrochromic device may have a clearing time of about 20 seconds to about 60 seconds. In another embodiment, the electrochromic device may have a clearing time of less than about 150 seconds. In another embodiment, the electrochromic device may have a clearing time of less than about 150 seconds, about 140 seconds, about 130 seconds, about 120 seconds, about 110 seconds, about 100 seconds, about 100 seconds, about 90 seconds, about 80 seconds, about 70 seconds, about 60 seconds, about 50 seconds, about 40 seconds, about 30 seconds, about 20 seconds, or ranges between any two of these values (including endpoints).

In one embodiment, the electrochromic device may have a darkening time of about 5 seconds to about 30 seconds. In another embodiment, the electrochromic device may have a darkening time of about 10 seconds to about 20 seconds.

In some embodiments, the concentration of the anodic and/or cathodic materials can range from approximately 1 millimolar (mM) to approximately 500 mM and more preferably from approximately 2 mM to approximately 100 mM.

In one embodiment, at least one of the anodic electroactive materials has a concentration of at least 5 mM. In another embodiment, at least one of the anodic electroactive materials has a concentration of about 2 mM to about 100 mM, about 5 mM to about 75 mM, about 7 mM to about 70 mM, or ranges between any two of these values (including endpoints). In another embodiment, at least one of the anodic electroactive materials has a concentration of about 5 mM to about 7 mM. In another embodiment, a second anodic electroactive material has a concentration of about 50 mM to about 60 mM.

In one embodiment, at least one of the cathodic electroactive materials has a concentration of at least 50 mM. In another embodiment, at least one of the cathodic electroactive materials has a concentration of about 50 mM to about 100 mM, about 60 to about 90 mM, about 70 mM to about 80 mM, or ranges between any two of these values (including endpoints).

In another embodiment, the electrochromic device may have a contrast ratio of at least about 2,000:1. In another embodiment, the electrochromic device may have a contrast ratio of at least about 10,000:1. In another embodiment, the electrochromic device may have a contrast ratio of at least about 40,000:1. In another embodiment, the electrochromic device may have a contrast ratio of at least about 60,000:1. In another embodiment, the electrochromic device may have a contrast ratio of at least about 80,000:1. In another embodiment, the electrochromic device may have a contrast ratio of about 2,000:1 to about 100,000:1. In another embodiment, the electrochromic device may have a contrast ratio of at least about 40,000:1, about 50,000:1, about 60,000:1, about 70,000:1, about 80,000:1, about 90,000:1, about 100,000:1, about 150,000:1, about 200,000:1, about 300,000:1, about 400,000:1, about 500,000:1, or ranges between any two of these values (including endpoints). In one embodiment, the electrochromic device may have a contrast ratio of about 40,000:1 to about 500,000:1. In another embodiment, the electrochromic device may have a contrast ratio of about 40,000:1 to about 500,000:1; 50,000:1 to about 450,000:1; about 60,000:1 to about 400,000:1; about 70,000:1 to about 350,000:1; about 80,000:1 to about 300,000:1; about 90,000:1 to about 250,000:1; about 100,000:1 to about 200,000:1; or ranges between any two of these values (including endpoints).

In some embodiments, a solvent of electrochromic composition may include, but is not limited to, 3-methylsulfolane, dimethyl sulfoxide, dimethyl formamide, tetraglyme and other polyethers; alcohols such as ethoxyethanol; nitriles, such as acetonitrile, glutaronitrile, 3-hydroxypropionitrile, and 2-methylglutaronitrile; ketones including 2-acetylbutyrolactone, and cyclopentanone; cyclic esters including beta-propiolactone, gamma-butyrolactone, gamma-valerolactone; organic carbonates such as, but not limited to, propylene carbonate (PC), ethylene carbonate; and homogenous mixtures of the same. In another embodiment, the electrochromic composition may include a propylene carbonate solvent.

In one aspect, the present technology is directed to an aircraft window system. Such a system may include a housing for containing a first substantially transparent interior substrate, a second substantially transparent exterior substrate, and a variable transmission electrochromic window positioned between the interior and exterior substrates, wherein the variable transmission electrochromic window includes: a third substantially transparent substrate having an electrically conductive material associated therewith; a fourth substantially transparent substrate having an electrically conductive material associated therewith; an electrochromic composition contained within a chamber positioned between the first and second substrates including at least one anodic electroactive material, at least one cathodic electroactive material, and at least one solvent, wherein at least one of the anodic electroactive and cathodic electroactive materials is electrochromic; and wherein the electrochromic device exhibits a contrast ratio of at least 20,000:1, a darkening time less than about 30 seconds, and a clearing time of less than about 150 seconds.

In some embodiments, the aircraft window system includes a variable transmission electrochromic window including an interior substrate and exterior substrate, which are secured within a housing. The aircraft window system may be suitable for application in, for example, private and commercial aircraft including, but not limited to, those manufactured by Boeing and Gulfstream.

In some embodiments, the interior substrate may include a substrate fabricated from a polycarbonate resin, such as Lexan. It will be understood that the interior substrate may be fabricated from any material acceptable within the aircraft industry as an interior substrate.

In some embodiments, the exterior substrate, or the primary pressure window, may include a substrate fabricated from glass, stretched acrylic or laminates thereof.

EXAMPLES

The following examples more specifically illustrate protocols for preparing polymers according to various embodiments described above. All measurements were taken at room temperature. These examples should in no way be construed as limiting the scope of the present technology.

Example 1

A variable transmission electrochromic window. A variable transmission electrochromic device was prepared by placing two indium tin oxide (ITO)-coated glass substrates spaced 250 μm apart in a parallel arrangement with the ITO coated sides facing each other. Each substrate had a conductive silver epoxy dispensed around the perimeter of the substrate. An epoxy seal was dispensed around the perimeter extending inward of the silver epoxy, between the two substrates, sealing the substrates together to form a chamber. The epoxy seal was allowed to cure. The chamber was then filled with an electrochromic composition in propylene carbonate. Included in the composition was 69.3 mM (bis-N,N'-(2-ethylhexyl) viologen $(BF_4)_2$; 53.0 mM 5,10-dihydro-5,10-dineopentyl phenazine; 5.8 mM 2,7-di-2-ethylbutyl-5,10-dineopentyl-5,10-dihydrophenazine; 5.8 mM 2,7-diisobutyl-5,10-dineopentyl-5,10-dihydrophenazine; 15 mM Tinuvin 384; 30 mM Tinuvin PE; 170 mM 4-methoxy-2-hydroxy benzophenone; 1.0 mM decamethyl ferrocinium $BF_4$; 0.5 mM decamethyl ferrocene; the composition was formed into a cross-linked polymer matrix as described in U.S. Pat. No. 6,635,194, entitled Electrochromic Medium Having A Self-Healing Cross-Linked Polymer Gel And Associated Electrochromic Device, where the polymer matrix was made from a 5.5% by weight polymer made from 2-hydroxyethyl methacrylate and methylacrylate at a 1:10 molar ratio, respectively, and cross-linked with 0.375% by weight 4,4'-methylenebis(phenyl isocyanate) (MDI) and catalyzed with 8 ppm dibutyltin diacetate.

Example 2

Timing results of two prepared electrochromic devices. A device similar to the device in Example 1 was prepared. The second device was prepared with 34.8 mM (bis-N,N'-(2-ethylhexyl) viologen $(BF_4)_2$; 26.5 mM 5,10-dihydro-5,10-dineopentyl phenazine; 5.8 mM 2,7-di-2-ethylbutyl-5,10-dineopentyl-5,10-dihydrophenazine; 15 mM Tinuvin 384; 30 mM Tinuvin PE; 85 mM 4-methoxy-2-hydroxybenzophenone; 1.0 mM decamethylferrocinium $BF_4$; 0.5 mM decamethylferrocene; 0.375% by weight MDI; 5.5% by weight of a co-polymer of 2-hydroxyethyl methacrylate and methylacrylate in a 1:10 molar ratio, respectively; and 8 ppm dibutyltin diacetate. The electrochromic medium was filled into a device as described in Example 1, but with a larger 500 μm cell spacing between the two sheets of ITO-coated glass. A voltage of 1.2 V was applied to each device, and the darkening and clearing times were measured as follows. The percent transmission was measured in half second intervals for 300 seconds to measure the darkening time for both devices. After 300 seconds, the voltage was removed and an external short circuit was placed between the two ITO electrodes to measure the clearing time for both devices. The results are shown in Table 1 and the FIGURE.

TABLE 1

Darkening and Clearing Times

| Voltage | Time (seconds) | Example 1 | Ex. 1 Contrast Ratio | Ex. 2 | Control Contrast Ratio |
|---|---|---|---|---|---|
| 1.2 | 0 | 65.23 | 1 | 62.67 | 1 |
| 1.2 | 5 | 3.66* | 17.8224044 | 11.87 | 5.279697 |
| 1.2 | 10 | 0.54 | 120.796296 | 5.67* | 11.05291 |
| 1.2 | 11 | 0.64 | 101.921875 | 5.1 | 12.28824 |
| 1.2 | 12 | 0.33 | 197.666667 | 4.9 | 12.7898 |
| 1.2 | 13 | 0.47 | 138.787234 | 4.1 | 15.28537 |
| 1.2 | 15 | 0.31 | 210.419355 | 3.32 | 18.87651 |
| 1.2 | 16 | 0.36 | 181.194444 | 3.02 | 20.75166 |
| 1.2 | 20 | 0.03 | 2174.33333 | 2.15 | 29.14884 |
| 1.2 | 60 | 0.08 | 815.375 | 0.18 | 348.1667 |
| 1.2 | 100 | 0.1 | 652.3 | 0.15 | 417.8 |
| 1.2 | 150 | 0.26 | 250.884615 | 0.05 | 1253.4 |
| 1.2 | 200 | 0.1 | 652.3 | 0.08 | 783.375 |
| 1.2 | 250 | 0.03 | 2174.33333 | 0.08 | 783.375 |
| 1.2 | 300 | 0.03 | 2174.3333 | 0.1 | 626.7 |
| 0 | 300.5 | 0.28 | 232.96428 | 0.49 | 127.898 |
| 0 | 310 | 0.49 | 133.122449 | 0.36 | 174.0833 |
| 0 | 320 | 6.06 | 10.7640264 | 0.9 | 69.63333 |
| 0 | 330 | 21.43 | 3.04386374 | 1.19 | 52.66387 |
| 0 | 340 | 41.71 | 1.56389355 | 2.88 | 21.76042 |
| 0 | 350 | 59.03 | 1.10503134 | 4.5 | 13.92667 |
| 0 | 355 | 63.49 | 1.02740589 | 6.07 | 10.32455 |
| 0 | 360 | 65.09** | 1.00215087 | 7.79 | 8.044929 |
| 0 | 365 | 64.16 | 1.01667706 | 9.42 | 6.652866 |
| 0 | 370 | 65.11 | 1.00184303 | 11.62 | 5.393287 |
| 0 | 400 | 65.08 | 1.00230486 | 30.11 | 2.081368 |
| 0 | 450 | 64.77 | 1.00710205 | 61.44** | 1.02002 |
| 0 | 500 | 65.04 | 1.00292128 | 64.07 | 0.978149 |
| 0 | 600 | 65.49 | 0.99602993 | 64.06 | 0.978302 |

*Designated coloring time;
**Designated clearing time

As illustrated by Table 1 and the FIGURE, the electrochromic device of Example 1, with a smaller cell spacing, had a much faster darkening and clearing time compared to the control, despite the fact that both reached a comparable low transmission state. In other words, devices may be prepared having a very low transmission state comparable to control devices, but which clear and darken in less time due to the smaller cell spacing. Table 1 also demonstrates that the light source and detector used is insufficient to accurately measure the low transmission values. This can most readily be seen in the noise in low transmission values between times of 60 and 300 seconds.

Example 3

(Comparative/Prior Art) An electrochromic window was constructed in the shape of a commercial aircraft window. The oval shaped window had a height of approximately 47.625 cm and a width of approximately 28.575 cm, and was constructed from two glass substrates having a conductive coating of ITO with a sheet resistance of approximately 2Ω/□ (see U.S. Pat. No. 7,990,603 entitled Variable Transmission Window System). The window was filled with a solution of 34.8 mM 2-ethylhexyl viologen $(BF_4)_2$; 26.5 mM 5,10-dihydro-dineopentyl phenazine; 5.8 mM 2,7-di-2-ethylbutyl-5,10-dineopentyl-5,10-dihydrophenazine; 15 mM Tinuvin 384; 30 mM Tinuvin PE; 85 mM 4-methoxy-2-hydroxy benzophenone; 1.0 mM decamethyl ferrocinium $BF_4$; 0.5 mM decamethyl ferrocene; 0.375% by weight MDI; 5.5% by weight a co-polymer of 2-hydroxyethyl methacrylate and methylacrylate at a 1:10 molar ratio; and 8 ppm dibutyl tin diacetate. The cell spacing was determined by a Keyence® LT-9001/LT-9030 measurement to be 543 μm near the center of the window and 582 μm near the edge. The window was measured using an Ocean Optics® single beam spectrometer and a dual beam Cary® 7000 UV-VIS-NIR spectrometer utilizing an optical density value of 4 "OD 4" neutral density filter to attenuate the reference beam. The high transmission value and fully darkened transmission value, defined as CIE Y using illuminant D65 and a 10° observer (see "Principles of Color Technology" (Billmeyer and Saltzman)) were measured. In addition, timing was measured on an Ocean Optics® spectrometer by applying 1.2 V to the window, via metal tabs embedded in a silver epoxy strip running around the perimeter of the window in contact with the transparent conductive coating for 800 seconds. The window was then shorted to return it to its high transmission state.

Example 4

An electrochromic window was prepared in a manner similar to Example 3, but with a cell spacing of 308 μm near the center and 331 μm near the edge. The window was filled with a solution of 69.6 mM 2-ethylhexyl viologen $(BF_4)_2$; 53.0 mM 5,10-dihydro-dineopentyl phenazine; 5.8 mM 2,7-di-2-ethylbutyl-5,10-dineopentyl-5,10-dihydrophenazine; 5.8 mM 2,7-diisobutyl-5,10-dineopentyl-5,10-dihydrophenazine; 30 mM Tinuvin PE; 1.0 mM decamethyl ferrocinium $BF_4$; 0.5 mM decamethyl ferrocene; 0.375% by weight MDI; 5.5% by weight a co-polymer of 2-hydroxyethyl methacrylate and methylacrylate at a 1:10 molar ratio and 8 ppm dibutyl tin diacetate. The window was measured in the same manner as the window in Example 3.

Example 5

An electrochromic window was prepared in a manner similar to Example 3, but with a cell spacing of 373 μm near the center and 301 μm near the edge and was filled with a solution of Example 5. The window was measured in the same manner as the window in Example 3.

Table 2 illustrates optical properties for the windows made in Examples 3, 4, 5 and 6.

TABLE 2

Optical properties of the windows

| Window | Clear State Transmission | Dark State Transmission | Contrast Ratio | Coloring Time | Clearing Time |
|---|---|---|---|---|---|
| Example 3 Center | 66.9 | 0.0020 | 33,450 | 23 | 355 |
| Example 4 Center | 67.5 | 0.0024 | 29,350 | 21 | 113 |
| Example 5 Center | 52.6 | 0.00017 | 310,000 | 16 | 173 |
| Example 6 Center | 53.9 | 0.0016 | 36,000 | 14 | 115 |
| Example 3 Edge | 64.0 | 0.00094 | 71,100 | 13 | 511 |
| Example 4 Edge | 67.6 | 0.00085 | 75,100 | 7 | 131 |
| Example 5 Edge | 50.6 | 0.00019 | 266,300 | 7 | 161 |
| Example 6 Edge | 50.0 | 0.0015 | 35,700 | 7 | 113 |

In addition to the high transmission and low transmission values, intermediate state values were measured using an Ocean Optics® spectrometer and holding the windows at 100 mV increments between 0.3 and 0.8V for 800 seconds, and measuring the CIE Y values near the center and near the edge of the window.

TABLE 3

The Transmission at the edge and center at intermediate voltages.

| Applied Potential (V) | Example 3 | | Example 4 | | Example 5 | | Example 6 | |
|---|---|---|---|---|---|---|---|---|
| | Center | Edge | Center | Edge | Center | Edge | Center | Edge |
| 0.3 | 5.95E+01 | 5.65E+01 | 6.44E+01 | 6.35E+01 | 4.96E+01 | 4.44E+01 | 5.12E+01 | 4.44E+01 |
| 0.4 | 3.15E+01 | 2.83E+01 | 4.22E+01 | 3.76E+01 | 2.89E+01 | 2.70E+01 | 3.29E+01 | 2.70E+01 |
| 0.5 | 5.84E+00 | 4.56E+00 | 1.52E+01 | 9.47E+00 | 7.76E+00 | 7.33E+00 | 1.09E+01 | 7.33E+00 |
| 0.6 | 4.77E−01 | 3.45E−01 | 4.12E+00 | 1.10E+00 | 1.37E+00 | 9.84E−01 | 2.45E+00 | 9.84E−01 |
| 0.7 | 2.13E−02 | 1.06E−02 | 1.04E+00 | 6.73E−02 | 1.65E−01 | 1.36E−01 | 4.96E−01 | 1.36E−01 |
| 0.8 | 3.49E−03 | 2.36E−03 | 1.98E−01 | 7.63E−03 | 2.26E−02 | 1.01E−02 | 6.80E−02 | 1.01E−02 | the center and 367 μm near the edge and an ITO sheet resistance of 1Ω/☐ was filled with a solution of example 4. The window was measured in the same manner as the window in Example 3.

Example 6

An electrochromic window was prepared in a manner similar to Example 5, but with a cell spacing of 301 μm near The windows were also visually examined in dim room light with a bright white background. Differences in transmission were observed between the edge and center at intermediate voltages, but it did not appear to correlate with the transmission difference measured between the edge and center. For example, the differences in transmission for Example 4 at 0.6 V were less noticeable than the differences for the same window at 0.7 V).

TABLE 4 the edge to center difference and the difference of the logs

| Applied Potential (V) | Example 3 | | Example 4 | | Example 5 | | Example 6 | |
|---|---|---|---|---|---|---|---|---|
| | Difference | Difference of logs | Difference | Difference of logs | Difference | Difference of logs | Difference | Difference of logs |
| 0.4 | 3.200372 | 0.046474 | 4.57789 | 0.049866 | 2.846844 | 0.045004 | 5.868226 | 0.085431 |
| 0.5 | 1.278551 | 0.10725 | 5.730513 | 0.205447 | 2.62354 | 0.179106 | 3.617451 | 0.174243 |
| 0.6 | 0.132201 | 0.140879 | 3.02332 | 0.575056 | 0.943253 | 0.504972 | 1.465877 | 0.396153 |
| 0.7 | 0.010754 | 0.304367 | 0.977403 | 1.191235 | 0.146217 | 0.946098 | 0.359951 | 0.562913 |
| 0.8 | 0.001129 | 0.169935 | 0.190412 | 1.41416 | 0.020743 | 1.075192 | 0.057822 | 0.826676 |

The difference of the $\log_{10}$ of the transmission values is found to be a better measure of the perceived transmission difference between the edge and center (for example the window of example 4 had a larger perceived edge to center difference at 0.7-0.8 V than at 0.5V, despite the difference in transmission values being significantly smaller. The prior art window with the larger cell spacing and smaller dynamic range shows very little perceived difference between the edge and center throughout the intermediate transmission levels. It is preferred that the difference of the logs of the transmission values between the center and edge "$M_{ce}(T)$" remains below 1 for all intermediate state voltages of the window and more preferably remains below 0.7 and more preferred to remain below 0.5.

The illustrative embodiments described in the detailed description and claims are not meant to be limiting. Other embodiments may be used, and other changes may be made, without departing from the spirit or scope of the subject matter presented here.

EQUIVALENTS

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. An electrochromic device comprising:
a first substantially transparent substrate;
second substantially transparent substrate substantially parallel to the first substantially transparent substrate and spaced apart therefrom; and
an electrochromic medium disposed between the first substantially transparent substrate and the second substantially transparent substrate;
wherein:
the electrochromic device is configured to exhibit a contrast ratio of at least 20,000:1, a darkening time less than about 30 seconds, and a clearing time of less than about 150 seconds; and the electrochromic medium comprises:
an anodic electroactive material; and
a cathodic electroactive material comprising a N,N'-dialkyldipyridinium compound.

2. The electrochromic device of claim 1, wherein the contrast ratio is from about 20,000:1 to about 500,000:1.

3. The electrochromic device of claim 1, wherein the contrast ratio is at least 40,000:1.

4. The electrochromic device of claim 1, wherein the contrast ratio is at least 60,000:1.

5. The electrochromic device of claim 1, wherein the clearing time is about 20 seconds to about 60 seconds.

6. The electrochromic device of claim 1, wherein the darkening time is about 5 seconds to about 30 seconds.

7. The electrochromic device of claim 1, wherein the anodic electroactive material is present in the medium at a concentration of at least 5 mM.

8. The electrochromic device of claim 1, wherein the anodic electroactive material is present in the medium at a concentration of about 5 mM to about 7 mM.

9. The electrochromic device of claim 1, wherein the cathodic electroactive material is present in the medium at a concentration of at least 50 mM.

10. The electrochromic device of claim 1, wherein the cathodic electroactive material is present in the medium at a concentration of about 60 mM to about 100 mM.

11. The electrochromic device of claim 1, wherein the first substantially transparent substrate and the second substantially transparent substrate are spaced apart by a distance of about 150 μm to about 500 μm.

12. The electrochromic device of claim 1, wherein the first substantially transparent substrate and the second substantially transparent substrate are spaced apart by a distance of about 200 μm to about 300 μm.

13. The electrochromic device of claim 1, wherein the anodic electroactive material comprises a 2,7-dialkyl-5,10-dialkyl-5,10-dihydrophenazine compound, and at least one alkyl of the 5,10-dialkyl groups has at least four carbon atoms, and is void of any β hydrogen atoms; and at least one alkyl group of the 2,7-dialkyl comprises at least four carbon atoms.

14. The electrochromic device of claim 13, wherein at least one alkyl group of the 5,10-dialkyl comprises a substituted or unsubstituted neopentyl group; and at least one alkyl group of the 2,7-dialkyl comprises a substituted or unsubstituted isopropyl, isobutyl, (2-ethylbutyl), or (2-propylpentyl) group.

15. The electrochromic device of claim 1, wherein at least one alkyl of the N,N'-dialkyldipyridinium compound comprises at least four carbon atoms, and includes less than two β hydrogen atoms.

16. The electrochromic device of claim 1, wherein the electrochromic medium comprises at least three different anodic electroactive materials.

17. An aircraft window system comprising:
a housing for containing a first substantially transparent interior substrate, a second substantially transparent exterior substrate, and a variable transmission electrochromic window positioned between the interior and exterior substrates, the variable transmission electrochromic window comprising:
a third substantially transparent substrate having an electrically conductive material associated therewith;
a fourth substantially transparent substrate having an electrically conductive material associated therewith, the fourth substantially transparent substrate positioned parallel to and spaced apart from the third substantially transparent substrate; and
an electrochromic medium disposed between the third and fourth substantially transparent substrates and contacting the electrically conductive material associated with third substrate and the electrically conductive material associate with the fourth substrate
wherein:
the electrochromic medium comprises:
an anodic electroactive material;
a cathodic electroactive material comprising a N,N'-dialkyldipyridinium compound; and
a solvent;
at least one of the anodic electroactive and cathodic electroactive materials is electrochromic;
the variable transmission electrochromic window exhibits a contrast ratio of at least 20,000:1;
the variable transmission electrochromic window exhibits a darkening time less than about 30 seconds; and
the variable transmission electrochromic window exhibits a clearing time of less than about 150 seconds.

18. The aircraft window composition of claim 17, wherein the window maintains a $M_{ce}(T)$ of less than 1 for all the intermediate transmission values of the window.

19. The aircraft window composition of claim 17, wherein the window maintains a $M_{ce}(T)$ of less than 0.7 for all the intermediate transmission values of the window.

* * * * *